(12) United States Patent
Kowalchuk

(10) Patent No.: US 10,820,491 B2
(45) Date of Patent: Nov. 3, 2020

(54) SYSTEM AND METHOD FOR INITIATING CONTROL OF COMPONENTS OF A WORK VEHICLE BASED ON INPUT RECEIVED FROM A USER INTERFACE OF AN ASSOCIATED AGRICULTURAL IMPLEMENT

(71) Applicant: CNH Industrial Canada, Ltd., Saskatoon (CA)

(72) Inventor: Trevor L. Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/059,643

(22) Filed: Aug. 9, 2018

(65) Prior Publication Data

US 2020/0045879 A1 Feb. 13, 2020

(51) Int. Cl.
*A01C 23/00* (2006.01)
*A01C 7/00* (2006.01)
*G05D 7/06* (2006.01)

(52) U.S. Cl.
CPC ............ *A01C 23/007* (2013.01); *A01C 7/004* (2013.01); *G05D 7/0641* (2013.01)

(58) Field of Classification Search
CPC ..... A01C 23/007; A01C 7/004; G05D 7/0641
See application file for complete search history.

(56) References Cited

U.S. PATENT DOCUMENTS

| | | | |
|---|---|---|---|
| 5,888,044 A | | 3/1999 | Baskerville |
| 5,924,371 A | * | 7/1999 | Flamme ............... A01B 79/005 111/177 |
| 5,931,882 A | * | 8/1999 | Fick ...................... A01B 79/005 111/903 |
| 5,956,255 A | * | 9/1999 | Flamme ............... A01B 79/005 111/903 |
| 6,003,455 A | * | 12/1999 | Flamme ............... A01C 23/007 111/200 |

(Continued)

OTHER PUBLICATIONS

Amity Technology, 3800/5250 Air Cart Owners Operating Manual 2015, P/N 330544, S/N 702045, 702060, 55 pages. https://www.amitytech.com/wp-content/uploads/2017/01/330544-9930-Operators-702060-.pdf.

*Primary Examiner* — Charles R Kasenge
(74) *Attorney, Agent, or Firm* — Rebecca L. Henkel; Rickard K. DeMille

(57) ABSTRACT

In one aspect a system for controlling the operation of an agricultural implement may include a vehicle-based controller configured to control an operation of a valve provided in operative association with a work vehicle, with the valve being configured to control a fluid flow to a plurality of fluid conduits. The system may also include an agricultural implement configured to be towed by the work vehicle. The implement may include a user interface having a first input device configured to receive an input associated with a selected fluid conduit of the plurality of fluid conduits. Furthermore, implement may include an implement-based controller supported on the implement and communicatively coupled to the user interface. The implement-based controller may be configured to initiate control of the operation of the valve based on the input received from the user interface in a manner that provides the fluid flow to the selected fluid conduit.

12 Claims, 5 Drawing Sheets

(56) References Cited

U.S. PATENT DOCUMENTS

| | | | | |
|---|---|---|---|---|
| 6,009,354 A * | 12/1999 | Flamme | ................ | A01B 79/005 172/4.5 |
| 6,024,035 A * | 2/2000 | Flamme | ................ | A01B 79/005 111/178 |
| 6,068,063 A | 5/2000 | Mayerle et al. | | |
| 6,070,538 A * | 6/2000 | Flamme | ................ | A01B 79/005 111/170 |
| 6,091,997 A * | 7/2000 | Flamme | ................ | A01B 79/005 111/903 |
| 6,182,588 B1 | 2/2001 | Bodie et al. | | |
| 6,691,603 B2 | 2/2004 | Linerode et al. | | |
| 6,748,884 B1 * | 6/2004 | Bettin | ................ | A01C 7/06 111/119 |
| 6,845,724 B2 | 1/2005 | Mayerle et al. | | |
| 6,851,377 B2 | 2/2005 | Mayerle et al. | | |
| 7,086,342 B2 | 8/2006 | O'Neall et al. | | |
| 7,316,110 B2 | 1/2008 | Schilling | | |
| 8,176,992 B2 | 5/2012 | Yuen | | |
| 8,408,326 B2 | 4/2013 | Yuen et al. | | |
| 8,893,630 B2 | 11/2014 | Kowalchuk | | |
| 8,903,545 B2 * | 12/2014 | Riffel | ................ | A01C 15/006 700/240 |
| 8,909,435 B2 | 12/2014 | Tuttle et al. | | |
| 8,948,975 B2 * | 2/2015 | Peterson | ................ | A01M 7/0089 70/36 |
| 9,357,689 B2 * | 6/2016 | Beck | ................ | A01B 59/00 |
| 9,386,738 B2 * | 7/2016 | Peterson | ................ | A01C 21/00 |
| 9,733,634 B2 * | 8/2017 | Prickel | ................ | G05B 15/02 |
| 9,769,977 B2 * | 9/2017 | Beck | ................ | A01B 59/00 |
| 9,788,476 B2 * | 10/2017 | Beck | ................ | A01B 59/00 |
| 9,801,331 B2 * | 10/2017 | Foster | ................ | G07C 5/0825 |
| 10,111,415 B2 * | 10/2018 | Kolb | ................ | A01M 7/0089 |
| 2013/0105583 A1 * | 5/2013 | Peterson | ................ | A01M 7/0089 235/492 |
| 2013/0110292 A1 * | 5/2013 | Peterson | ................ | A01C 21/00 700/283 |
| 2013/0110357 A1 * | 5/2013 | Peterson | ................ | A01M 7/0089 701/50 |
| 2015/0128834 A1 * | 5/2015 | Beck | ................ | A01B 59/00 111/200 |
| 2015/0167276 A1 * | 6/2015 | Brinkley | ................ | E02F 9/2285 137/596.16 |
| 2015/0168089 A1 * | 6/2015 | Brinkley | ................ | F28F 27/02 165/11.1 |
| 2015/0208571 A1 | 7/2015 | Hahn et al. | | |
| 2015/0225188 A1 | 8/2015 | Belluk et al. | | |
| 2015/0319913 A1 * | 11/2015 | Foster | ................ | A01B 69/00 701/26 |
| 2015/0325065 A1 * | 11/2015 | Foster | ................ | G07C 5/0825 701/50 |
| 2016/0123353 A1 | 5/2016 | Millie | | |
| 2016/0278280 A1 * | 9/2016 | Beck | ................ | A01B 59/00 |
| 2016/0278281 A1 * | 9/2016 | Beck | ................ | A01B 59/00 |
| 2016/0338335 A1 * | 11/2016 | Hammer | ................ | B05B 1/20 |
| 2017/0000016 A1 * | 1/2017 | Prickel | ................ | G05B 15/02 |
| 2017/0112043 A1 * | 4/2017 | Nair | ................ | A01B 63/002 |
| 2017/0251656 A1 * | 9/2017 | Kolb | ................ | A01C 23/023 |

* cited by examiner

SYSTEM AND METHOD FOR INITIATING CONTROL OF COMPONENTS OF A WORK VEHICLE BASED ON INPUT RECEIVED FROM A USER INTERFACE OF AN ASSOCIATED AGRICULTURAL IMPLEMENT

FIELD

The present disclosure generally relates to work vehicles and agricultural implements and, more particularly, to systems and methods for initiating control of one or more components of a work vehicle based on one or more inputs received from a user interface of an agricultural implement coupled to the work vehicle.

BACKGROUND

Modern farming practices strive to increase yields of agricultural fields. In this respect, seed planting implements are towed behind a tractor or other work vehicle to disperse seed throughout a field. For example, seed planting implements typically include one or more ground engaging tools or openers that form a furrow or trench in the soil. One or more dispensing devices of the seed planting implements may, in turn, deposit the seeds into the furrow(s). After deposition of the seeds, a packer wheel may pack the soil on top of the deposited seeds.

Some planting implements receive seeds from an associated air cart. Specifically, the air cart may include a fan that creates a flow of pressurized air for conveying the seeds through various conduits from a hopper of the air cart to the dispensing devices of the seed planting implement. Furthermore, the air cart may also include an auger that facilitates filling of the hopper with seeds. In certain configurations, the fan and the auger may be driven by a flow of hydraulic fluid received from the work vehicle. Since the fan and auger are generally operated at different times (e.g., the fan is operating during seed planting operations, while the auger is operated during hopper filling operations), the same flow of hydraulic fluid may be used to drive both devices. In this regard, one or more valves on the work vehicle may selectively adjust the flow of hydraulic fluid between the fan and the auger.

Some work vehicles may include one or more input devices (e.g., switches) located in their cabs that allow the operator to control the valve(s) in a manner that adjusts the flow of hydraulic fluid between the fan and the auger. For example, when switching from a seed planting operation to a hopper filling operation, the operator adjusts the appropriate input device(s) within the cab to redirect the flow of the hydraulic fluid from the fan to the auger. Thereafter, the operator may exit the cab and walk to the air cart to connect the auger to a bulk supply of seeds (e.g., a truck). If the operator reaches the air cart and realizes he/she forgot to adjust the input device(s) before exiting the cab, he/she must then walk back to cab to do so. However, the size of current air carts and seed planting implements make trips between the cab and the air cart time-consuming.

Accordingly, an improved system and method for initiating control of one or more components of a work vehicle based on one or more inputs received from an agricultural implement coupled to the work vehicle would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling the operation of an agricultural implement. The system may include a work vehicle having a vehicle-based controller, with the vehicle-based controller configured to control an operation of a valve provided in operative association with the work vehicle. The valve may, in turn, be configured to control a fluid flow to a plurality of fluid conduits. The system may also include an agricultural implement configured to be towed by the work vehicle. The implement may include a user interface having a first input device configured to receive an input associated with a selected fluid conduit of the plurality of fluid conduits. Furthermore, implement may include an implement-based controller supported on the implement and communicatively coupled to the user interface. The implement-based controller may be configured to initiate control of the operation of the valve based on the input received from the user interface in a manner that provides the fluid flow to the selected fluid conduit.

In another aspect, the present subject matter is directed to a method for controlling the operation of an agricultural implement. The method may include controlling, with an implement-based computing device installed on the implement, an operation of an agricultural implement as the implement is being towed across a field by a work vehicle. The work vehicle may include a vehicle-based computing device configured to control an operation of a valve provided in operative association with the work vehicle, with the valve being configured to control a fluid flow to a plurality of fluid conduits. The method may also include receiving, with the implement-based computing device, an input associated with a selected fluid conduit of the plurality of fluid conduits from a user interface of the implement. Furthermore, the method may include initiating, with the implement-based computing device, control of the operation of the valve based on the input received from the user interface in a manner that provides the fluid flow to the selected fluid conduit.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
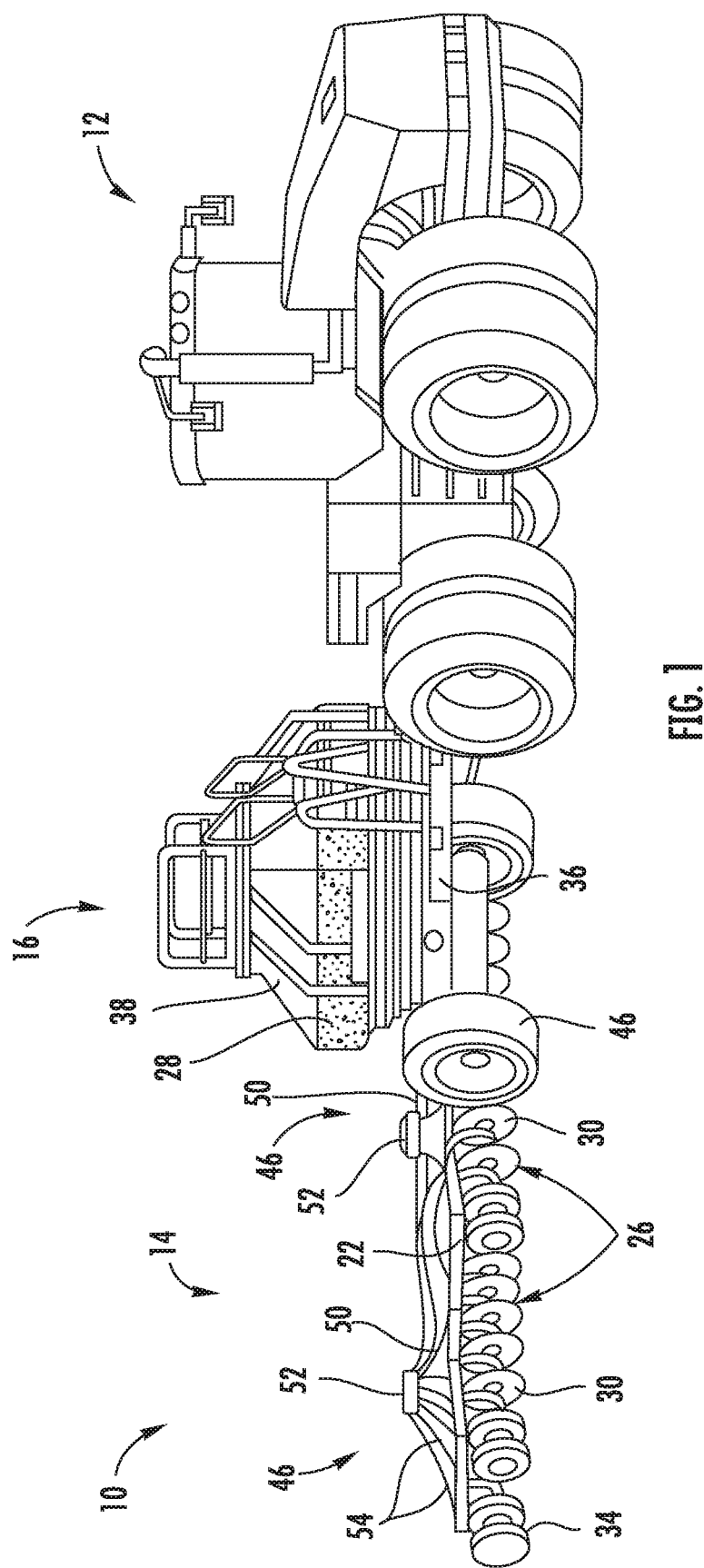
FIG. 1 illustrates a side view of one embodiment of an agricultural implement and an associated work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural implement coupled to a work vehicle. In several embodiments, the work vehicle may include a vehicle-based controller(s) configured to control the operation of a valve(s) provided in operative association with the vehicle. The valve(s) may, in turn, control the flow of fluid to a plurality of fluid conduits configured to convey fluid flow from the work vehicle to one or more fluid-driven devices supported on the implement. Furthermore, the implement may include a user interface configured to receive an input associated with a selected fluid conduit of the plurality of fluid conduits. In this regard, an implement-based controller(s) supported on the implement may be configured to initiate control of the operation of valve(s) of the work vehicle based on the input received from the user interface to provide the fluid flow to the selected fluid conduit. For instance, upon receipt of the input from the user interface, the implement-based controller may be configured to transmit signals to the vehicle-based controller(s) (e.g., via ISOBUS Class 3 communications protocols (ISO 11783-9)) requesting the vehicle-based controller(s) to control the operation of the valve(s) in a manner that provides the fluid flow to the selected fluid conduit. As such, based on the request from the implement-based controller(s), the vehicle-based controller(s) may control the valve(s) such that fluid flow is provided to the selected fluid conduit.

In accordance with aspects of the present subject matter, the disclosed system may be configured to control the operation of the valve(s) such that the fluid flow is delivered to a first fluid-driven device when the implement is in a first operational mode and a second fluid-driven device when the implement is in a second operational mode. For example, in one embodiment, when the implement is in the first operational mode, a first fluid conduit may be configured to convey the fluid flow to a tank filling mechanism (e.g., an auger) of the implement in a manner that drives the tank filling mechanism. Conversely, when the implement is in a second operational mode, a second fluid conduit may be configured to convey the fluid flow to a fan of the implement in a manner that drives the fan. In such embodiments, the user interface may be configured to receive an input associated with a selected operational mode of the implement. As such, the implement-based controller may be configured to initiate control of the operation of the valve(s) based on the selected operational mode in a manner that provides the fluid flow to the corresponding fluid conduit. For example, when the first operational mode is selected, the implement-based controller may be configured to initiate control of the operation of the valve(s) such that the fluid flow is provided to the first fluid conduit, thereby driving the fan. Conversely, when the second operational mode is selected, the implement-based controller may be configured to initiate control of the operation of the valve(s) such that the fluid flow is provided to the second fluid conduit, thereby driving the tank filling device.

Figure 2:
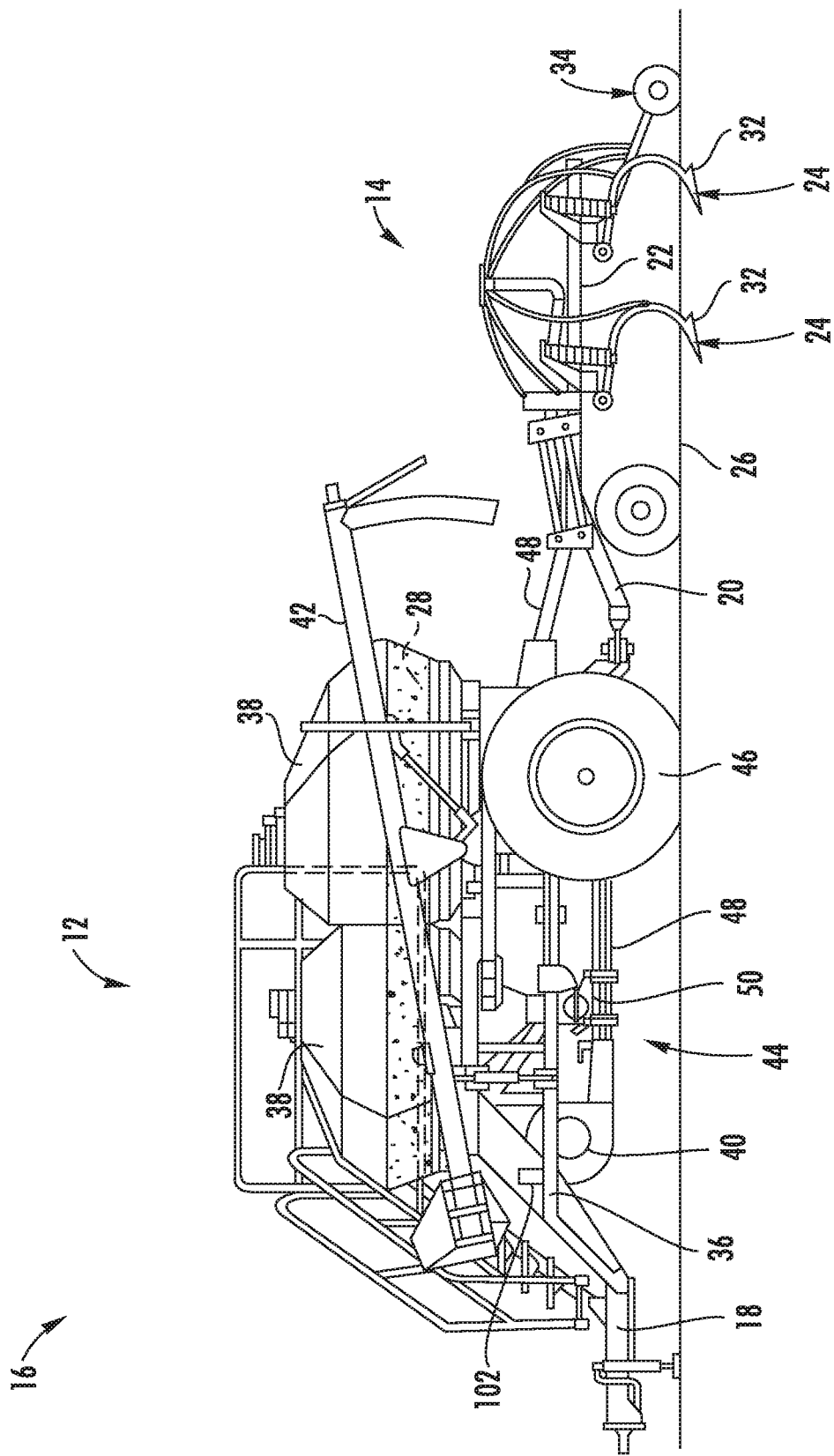
FIG. 2 illustrates an alternative side view of an agricultural implement in accordance with aspects of the present subject matter, particularly illustrating various components of the implement.

Referring now to the drawings, FIGS. 1 and 2 illustrate differing side views of one embodiment of an agricultural implement 10 in accordance with aspects of the present subject matter. Specifically, FIG. 1 illustrates a side view of the agricultural implement 10 coupled to a work vehicle 12. Additionally, FIG. 2 illustrates a side view of the implement 10, particularly illustrating various components of the implement 10. As shown, the implement 10 may be configured as a seed planting device 14 and an associated air cart 16 and the work vehicle 12 may be configured as an agricultural tractor. However, in other embodiments, the implement 10 may be configured as any other suitable type of implement, such as another seed dispensing implement, a side dresser or another fertilizer dispensing implement, a strip tiller, a cultivator or another tillage implement, and/or the like. Similarly, in alternative embodiments, the work vehicle 12 may be configured as any other suitable type of vehicle, such as an agricultural harvester, a self-propelled sprayer, and/or the like.

As shown, the air cart 16 may be configured to be towed directly behind the work vehicle 12, with the seed planting device 14 being towed behind the air cart 16. In this regard, a hitch assembly 18 (FIG. 2) may be configured to couple the air cart 16 to the work vehicle 12. Although the hitch assembly 18 is illustrated in FIG. 2 as corresponding to a hitch of the air cart 16, the hitch assembly 18 may also correspond to a hitch of the work vehicle 12. Furthermore, a hitch assembly 20 may be configured to couple the seed planting device 14 to the air cart 16. Although the hitch assembly 20 (FIG. 2) is illustrated as corresponding to a hitch of the seed planting device 14, the hitch assembly 20 may also correspond to a hitch of the air cart 16. Additionally, in alternative embodiments, the seed planting device 14 may be towed directly behind the work vehicle 12, with the air cart 16 being towed behind the seed planting device 14. For example, in such embodiments, the seed planting device 14 may be coupled to the work vehicle 12 via the hitch assembly 20 and the air cart 16 may be coupled to the seed planting device 14 via the hitch assembly 18. In a further embodiment, the air cart 16 and the seed planting device 14 may be part of a single unit that is towed behind the work vehicle 12, or elements of a self-propelled vehicle configured to distribute agricultural product across a field.

In several embodiments, the seed planting device 14 may include a frame 22 configured to support or couple to various components of the seed planting device 14, such as one or more ground-engaging tools 24. In general, the ground-engaging tool(s) 24 may be configured to excavate a furrow or trench in soil 26 to facilitate deposition of a flowable granular or particulate-type agricultural product 28, such as seeds, fertilizer, and/or the like. For example, in the embodiment illustrated in FIG. 1, each ground-engaging tool 24 may be configured as an opener disc 30. Alternatively, in the embodiment shown in FIG. 2, each ground-engaging tool 24 may be configured as a hoe or shank 32. However, it should be appreciated that the ground-engaging tool 24 may be configured as any suitable device for creating a furrow in the soil 26 that is suitable for receiving the agricultural product 28. Furthermore, the seed planting device 14 may generally include any number of ground-engaging tools 24 to facilitate delivery of the agricultural product 28 across a given swath of the soil 26. For instance, in one embodiment, the seed planting device 14 may include twenty-four ground-engaging tools 24 spaced apart across the width of the seed planting device 14. In alternative embodiments, however, the seed planting device 14 may include any other suitable number of ground-engaging tools 24, such as less than twenty-four ground-engaging tools 24 or more than twenty-four ground-engaging tools 24. Additionally, the seed planting device 14 may also include one or more closing wheels or discs 34 configured to close the furrow after the agricultural product 28 has been deposited into the furrow.

In accordance with aspects of the present disclosure, the air cart 16 may be configured to store the agricultural product 28 to be deposited within the soil 26. Specifically, in several embodiments, the air cart 16 may include a frame 36 configured to support or couple to various components of the air cart 16. For example, as shown, the frame 36 may be configured to support a hopper or storage tank 38 configured for storing the agricultural product 28 to be deposited within the furrow. The frame 36 may also be configured to support a fan or pressurized air source 40 (FIG. 2) and a tank filling mechanism 42 (FIG. 2), such as an auger, conveyor, and/or the like. As will be described below, when the implement 10 is in an operational or seed planting mode, the fan 40 may be configured to provide a flow of pressurized air for conveying the seeds from the hopper 38 to the seed planting device 14. Conversely, when the implement 10 is in a non-operational or hopper filling mode, the auger 42 may be configured to facilitate filling of the hopper 38 from a bulk supply of seeds (e.g., a truck). Moreover, a metering system 44 (FIG. 2) may be supported on the frame 36. Additionally, in one embodiment, a plurality of wheels 46 may be coupled to the frame 36 to permit the air cart 16 to be towed across a field by the work vehicle 12.

Furthermore, a plurality of delivery conduits 48 of the implement 10 may be configured to convey the agricultural product 28 from the air cart 16 to the seed planting device 14 for deposition into the furrow. Specifically, in several embodiments, the agricultural product 28 contained within the hopper 38 may be gravity fed into the metering system 44. As such, the metering system 44 may be configured to distribute a desired quantity of the agricultural product 28 to the delivery conduits 48. For example, in one embodiment, a primary header 50 (FIG. 2) coupled between the metering system 44 and the delivery conduits 48 may direct the agricultural product 28 into each of the delivery conduits 48. Pressurized air provided by the fan 40 to the delivery conduits 48 may then carry the agricultural product 28 through the delivery conduits 48 to the seed planting device 14.

In accordance with aspects of the present subject matter, the implement 10 may include a user interface 102 configured to receive an input from an operator of the implement 10, such as an input associated with a selected operational mode or state of one or more devices or components mounted on the implement 10. As will be described below, the user interface 102 may include one or more input devices, such as one or more touchscreens, keypads, touchpads, knobs, buttons, sliders, switches, mice, microphones, and/or the like, which are configured to receive inputs from the operator. In addition, some embodiments of the user interface 102 may include one or more feedback devices (not shown), such as display screens, speakers, warning lights, and/or the like, which are configured to communicate feedback, such as feedback from a controller, to the operator of the implement 10. However, in alternative embodiments, the user interface 102 may have any suitable configuration.

In several embodiments, the user interface 102 may be installed on or otherwise provided in operative association with the implement 10. For example, in one embodiment, the user interface 102 may be installed on the air cart 16 at a position that allows an operator standing adjacent to the air cart 16 to operate or otherwise interact with the user interface 102. Such positioning of the user interface 102 may allow the operator to control one or more aspects of the air cart 16 while standing adjacent to the air cart 16. However, it should be appreciated that, in alternative embodiments, the user interface 102 may be positioned at any other suitable location on the air cart 16 or on the seed planting device 14. Furthermore, it should be appreciated that, in one embodiment, the user interface 102 may correspond to a remote device, such as a tablet or smart phone, provided in association with the implement 10. Additionally, in a further embodiment, a remote device may be communicatively coupled (e.g., via Bluetooth) such that the remote device is configured to transmit input from the operator of the implement 10 to the user interface 102.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of work vehicle, air cart, and/or implement configuration.

Figure 3:
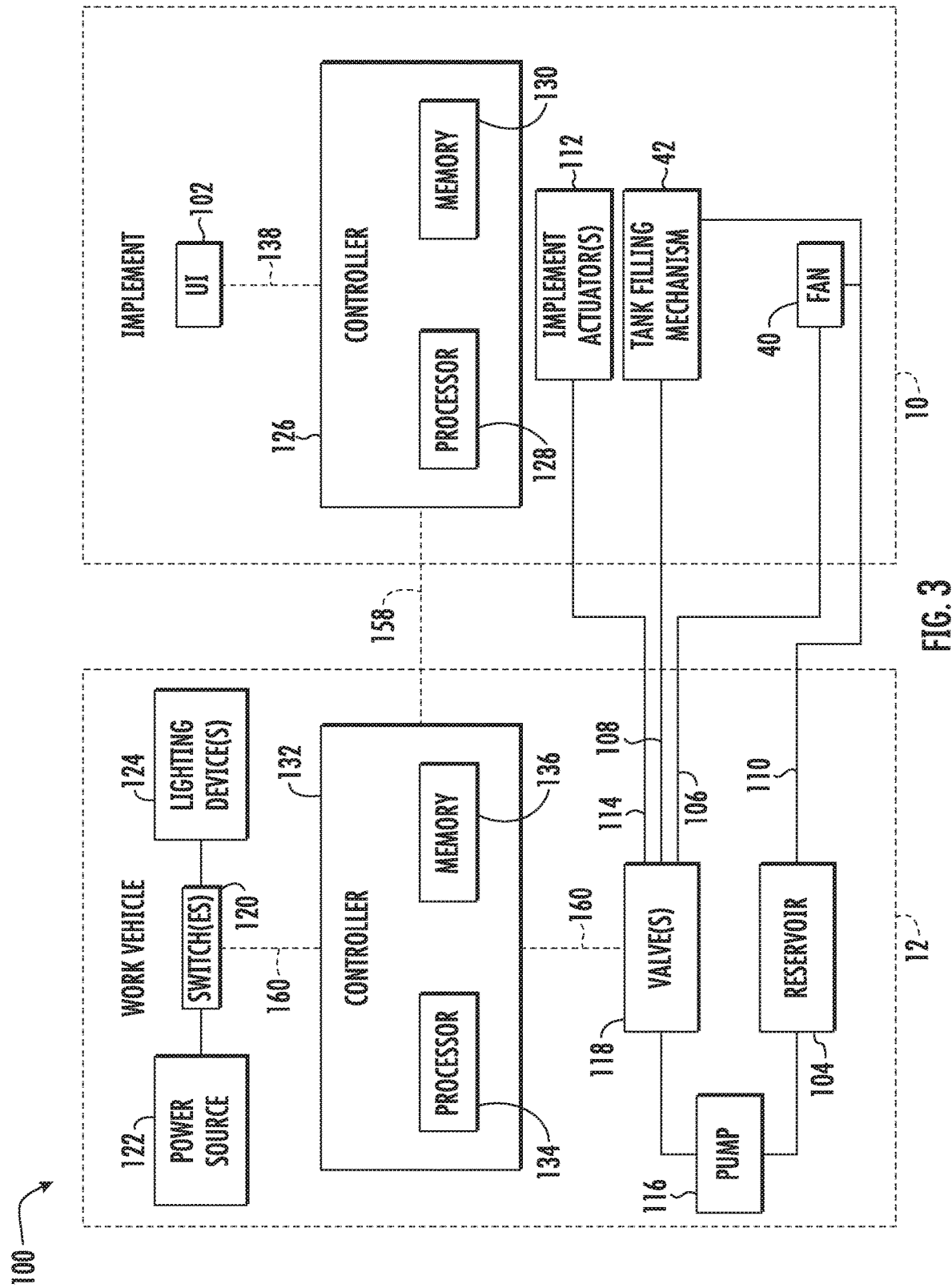
FIG. 3 illustrates a schematic view of one embodiment of a system for controlling the operation of an agricultural implement in accordance with aspects of the present subject matter.

Referring now to FIG. 3, a schematic view of one embodiment of a system 100 for controlling the operation of an agricultural implement in accordance with aspects of the present subject matter. In general, the system 100 will be described herein with reference to the implement 10 and the work vehicle 12 described above with reference to FIGS. 1 and 2. However, it should be appreciated by those of ordinary skill in the art that the disclosed system 100 may generally be utilized with implements having any other suitable implement configuration and/or work vehicles having any other suitable vehicle configuration.

As shown in FIG. 3, the system 100 may be configured to provide a pressurized fluid flow (e.g., a pressurized hydraulic oil flow) from a reservoir 104 on the work vehicle 12 to the fan 40 and the tank filling mechanism 42 of the air cart 16. Specifically, in several embodiments, the fan 40 and the tank filling mechanism 42 may be driven or otherwise powered by the fluid flow from the work vehicle 12. In this regard, a first fluid conduit 106 may be configured to convey the fluid flow from the reservoir 104 to the fan 40 in a manner that drives the fan 40, thereby producing the flow of pressurized air. Similarly, a second fluid conduit 108 may be configured to convey or otherwise provide the fluid flow to the tank filling mechanism 42 in a manner that drives the tank filling mechanism 42. A return fluid conduit 110 may be configured to return the fluid delivered to the fan 40 and the tank filling mechanism 42 to the reservoir 104.

Moreover, in one embodiment, the system 100 may also be configured to provide the pressurized fluid flow from the reservoir 104 to one or more implement actuators 112. In general, the implement actuator(s) 112 may correspond to any suitable device(s) on the implement 10 configured to adjust position of an associated tool(s) on the implement 10. For example, in one embodiment, the implement actuator(s) 112 may correspond to a fluid-driven cylinder(s) (not shown) mounted on the seed planting device 14 and configured to adjust the position of one or more of the ground engaging tools 24 of the seed planting device 14 relative to the ground, such as between an operational position in which the tool(s) 24 engage the soil 26 and a non-operational position in which the tool(s) 24 are lifted out of the soil 26. In this regard, a third fluid conduit 114 may be configured to convey the fluid flow to the implement actuator(s) 114. It should be appreciated that, in alternative embodiments, the system 100 may include additional fluid conduits configured to convey the fluid flow from the reservoir 104 to any other suitable fluid-driven or fluid-actuated device(s) or component(s) of the implement 10.

Furthermore, the system 100 may include any suitable fluid-related components for controlling the fluid flow between the reservoir 104 and the various implement components 40, 42, 112. For example, as shown in FIG. 3, the system 100 may include a pump 116 of the work vehicle 12, with the pump 116 configured to pump fluid from the reservoir 104 to one or more of the conduits 106, 108, 114. Furthermore, the system 100 may include one or more valves 118 of the work vehicle 12, with the valve(s) 118 configured to selectively occlude the flow of fluid through the conduits 106, 108, 114. For instance, in one embodiment, the valve(s) 118 may be configured to permit fluid flow through the first fluid conduit 106 and occlude fluid flow through the second fluid conduit 108 when the implement 10 is in an operational or seed planting mode. Conversely, the valve(s) 118 may be configured to permit fluid flow through the second fluid conduit 108 and occlude fluid flow through the first fluid conduit 106 when the implement 10 is in a non-operational or hopper filling mode. Furthermore, the valve(s) 118 may be configured to permit fluid flow through the third fluid conduit 114 when the ground engaging tool(s) 24 is being adjusted between its operational and non-operational positions. It should be appreciated that the valve(s) 118 may be configured as any suitable valve(s) on the work vehicle 12. For example, in several embodiments, the valve(s) 118 may be configured as one or more electro-hydraulic remote (EHR) valve blocks. Moreover, it should be appreciated that the valve(s) 118 may be configured to control the flow of fluid to any other suitable components of the implement 10.

Additionally, in one embodiment, the system 100 may include one or more switches 120 of the work vehicle 12. Specifically, the switch(es) 120 may be configured to control the flow of electrical current between a power source 122 (e.g., a battery or alternator of the work vehicle 12) and one or more lighting devices 124. For example, the switch(es) 120 may be configured to permit the flow of electrical current to the lighting device(s) 124 when the lighting device(s) 124 is in an operational or illuminated mode. Conversely, the switch(es) 120 may be configured to prevent the flow of electrical current to the lighting device(s) 124 when the lighting device(s) 124 is in a non-operational or non-illuminated mode. It should be appreciated that the lighting device(s) 124 may be configured as any suitable device(s) for emitting light, such as a light-emitting diode(s) (LED(s)), an incandescent lamp(s), a halogen lamp(s), and/or the like. Moreover, the switch(es) 120 may be configured as any suitable switching device(s), such as a single-pole, single-throw switch(es), a single-pole, double-throw switch(es), and/or the like. Although the lighting device(s) 124 is shown as mounted on or otherwise provided in operative association with the work vehicle 12 in FIG. 3, it should be further appreciated that, in alternative embodiments, the lighting device(s) 124 may be mounted on or otherwise provided in operative association with the implement 10.

In accordance with aspects of the present subject matter, the system 100 may include one or more implement-based controllers 126 positioned on and/or within or otherwise associated with the implement 10. In general, the implement controller(s) 126 may comprise any suitable processor-based device known in the art, such as a computing device or any suitable combination of computing devices. Thus, in several embodiments, the implement controller(s) 126 may include one or more processor(s) 128 and associated memory device(s) 130 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 130 of the implement controller(s) 126 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 130 may generally be configured to store suitable computer-readable instructions that, when implemented by the processor(s) 128, configure the implement controller(s) 126 to perform various computer-implemented functions, such as one or more aspects of the method 200 described below with reference to FIG. 5. In addition, the implement controller(s) 126 may also include various other suitable components, such as a communications circuit or module, one or more input/output channels, a data/control bus and/or the like.

It should be appreciated that the implement controller(s) 126 may correspond to an existing controller(s) of the implement 10, itself, or the controller(s) 126 may correspond to a separate processing device(s). For instance, in one embodiment, the implement controller(s) 126 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller(s) 126 may be performed by a single processor-based device or may be distributed across any number of processor-based devices, in which instance such devices may be considered to form part of the implement controller(s) 126.

Moreover, the system 100 may include one or more work vehicle-based controllers 132 positioned on and/or within or otherwise associated with the work vehicle 12. In general, the vehicle controller(s) 132 may comprise any suitable processor-based device known in the art, such as a computing device or any suitable combination of computing devices. Thus, in several embodiments, the controller(s) 120 may include one or more processor(s) 134 and associated memory device(s) 136 configured to perform a variety of computer-implemented functions. Such memory device(s) 136 may generally be configured to store suitable computer-readable instructions that, when implemented by the processor(s) 134, configure the vehicle controller(s) 132 to perform various computer-implemented functions, such as one or more aspects of the method 200 described below with reference to FIG. 5. In addition, the vehicle controller(s) 132 may also include various other suitable components, such as a communications circuit or module, one or more input/output channels, a data/control bus and/or the like.

It should be appreciated that the vehicle controller(s) 132 may correspond to an existing controller(s) of the work vehicle 12, itself, or the controller(s) 132 may correspond to a separate processing device. For instance, in one embodiment, the vehicle controller(s) 132 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller(s) 132 may be performed by a single processor-based device or may be distributed across any number of processor-based devices, in which instance such devices may be considered to form part of the vehicle controller(s) 132. For instance, the functions of the vehicle controller(s) 132 may be distributed across multiple application-specific controllers, such as an electro-hydraulic remote (EHR) valve controller and/or the like.

In several embodiments, the implement controller(s) 126 may be configured to initiate control of the operation of the valve(s) 118 based on an input received from the user interface 102. Specifically, the implement controller(s) 126 may be communicatively coupled to the user interface 102 via a wired or wireless connection to allow input signals (e.g., indicated by dashed lines 138 in FIG. 3) to be transmitted from the user interface 102 to the controller(s) 126. In this regard, the implement controller(s) 126 may be configured to receive an input associated with a selected fluid conduit of the fluid conduits 106, 108, 114 from the user interface 102. Based on the received input, the implement controller(s) 126 may be configured to initiate control of the operation of the valve(s) 118 in a manner that provides the fluid flow to the selected fluid conduit.

In one embodiment, the implement controller(s) 126 may be configured to initiate control of the operation of the valve(s) 118 based on input associated with a selected operational mode of the implement 10. As indicated above, the implement 10 may have an operational or seed planting mode and a non-operational or hopper filling mode. In this regard, the implement controller(s) 126 may be configured to receive an input associated with a selected operational mode of the seed planting and hopper filling modes from the user interface 102. Thereafter, the implement controller(s) 126 may be configured to initiate control of the valve(s) 118 in a manner that provides the fluid flow to the corresponding fluid conduit 106, 108. For example, when the implement controller(s) 126 receives an input indicative of the seed planting mode, the implement controller(s) 126 may initiate control of the valve(s) 118 such that fluid flow is provided to the first fluid conduit 106, thereby driving the fan 40. Conversely, when the implement controller(s) 126 receives an input indicative of the hopper filling mode, the implement controller(s) 126 may be configured to initiate control of the valve(s) 118 such that fluid flow is provided to the second fluid conduit 108, thereby driving the tank filling mechanism 42.

Additionally, the implement controller(s) 126 may be configured to initiate control of the operation of the valve(s) 118 based on input associated with a selected speed of the fan 40 and/or the tank filling mechanism 42. As such, the implement controller(s) 126 may be configured to receive an input associated with a selected speed of the fan 40 or the tank filling mechanism 42 from the user interface 102. Thereafter, the implement controller(s) 126 may be configured to initiate control of the valve(s) 118 in a manner that adjusts or otherwise provides a volume of fluid to the fan 40 or the tank filling mechanism 42 (e.g., via the corresponding fluid conduit 106, 108) such that the fan 40 or the tank filling mechanism 42 is operated at the selected speed. For example, when the implement controller(s) 126 receives an input indicative of an increase in the operating speed of the fan 40 or the tank filling mechanism 42, the implement controller(s) 126 may initiate control of the valve(s) 118 such that an increased volume of fluid is provided to the corresponding fluid conduit 106, 108, thereby increasing the operating speed of the fan 40 or the tank filling mechanism 42. Conversely, when the implement controller(s) 126 receives an input indicative of a decrease in the operating speed of the fan 40 or the tank filling mechanism 42, the implement controller(s) 126 may initiate control of the valve(s) 118 such that a decreased volume of fluid is provided to the corresponding fluid conduit 106, 108, thereby decreasing the operating speed of the fan 40 or the tank filling mechanism 42.

Moreover, in one embodiment, the implement controller(s) 126 may be configured to initiate control of the operation of the valve(s) 118 based on input associated with a selected position of the ground engaging tool(s) 24 of the implement 10. As indicated above, the ground engaging tool(s) 24 may be adjustable between an operational or ground engaging position and a non-operational or lifted position. In this regard, the implement controller(s) 126 may be configured to receive an input associated with a selected position of the operational and non-operational positions from the user interface 102. In the event that the selected position of the ground engaging tool(s) 24 is different than its current position, the implement controller(s) 126 may be configured to initiate control of the valve(s) 118 to provide the fluid flow to the third fluid conduit 114 in a manner that adjusts the position of the ground engaging tool(s) 24. As such, the third fluid conduit 114 may convey the fluid flow to implement actuator(s) 112 (e.g., a rod-side chamber or a cap-side chamber thereof) to adjust the position of associated ground engaging tool(s) 24 between the operational and non-operational positions.

Additionally, in one embodiment, the implement controller(s) 126 may be configured to initiate control of the operation of the switch(es) 120 based on input associated with a selected operational state of the lighting device(s) 124. As indicated above, the lighting device(s) 124 may have an operational or illuminated state and a non-operational or non-illuminated state. In this regard, the implement controller(s) 126 may be configured to receive an input associated with a selected operational state of the lighting device(s) 124 from the user interface 102. Thereafter, the implement controller(s) 126 may be configured to initiate control of the switch(es) 120 based on the received input. For example, when the implement controller(s) 126 receives an input associated with the illuminated state, the implement controller(s) 126 may be configured to initiate control of the switch(es) 120 such that electrical current is provided to the lighting device(s) 124. Conversely, when the implement controller(s) 126 receives an input associated with the non-illuminated state, the implement controller(s) 126 may be configured to initiate control of the switch(es) 120 such that electrical current is blocked from lighting device(s) 124.

Figure 4:
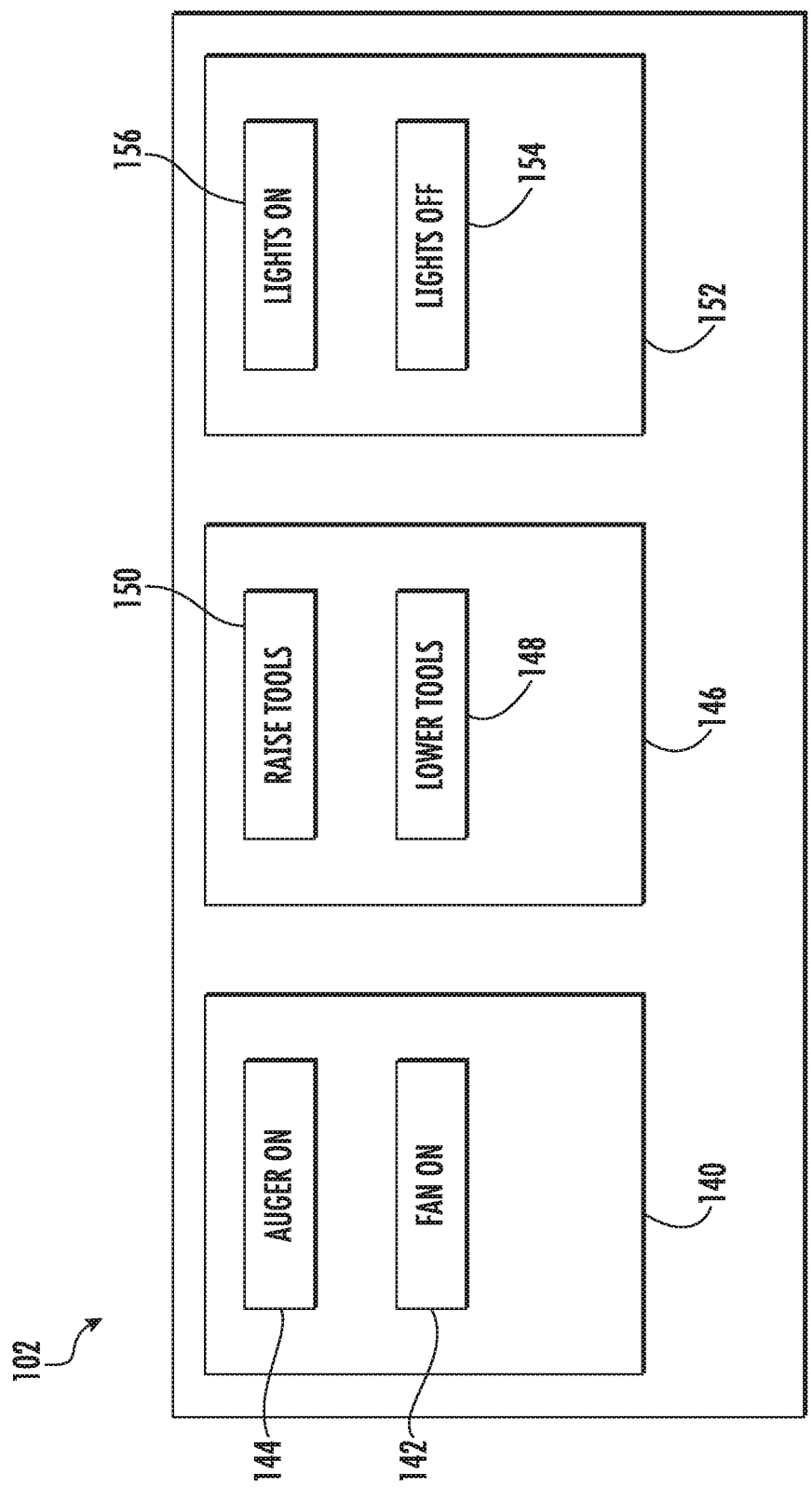
FIG. 4 illustrates an example view of a user interface that may receive inputs associated with a desired operational state of an agricultural implement from an operator of the implement in accordance with aspects of the present subject matter.

Referring now to FIG. 4, an example of view of the user interface 102 for receiving the above-described inputs from an implement operator is illustrated in accordance with aspects of the present subject matter. Specifically, as shown, the user interface 102 may include a first input device 140 configured to receive inputs associated with the selected operating mode of the implement 10. For example, in the illustrated embodiment, the first input device 140 includes first and second buttons 142, 144. When a first button 142 is pressed, the input transmitted to the implement controller(s) 126 is indicative of the seed planting mode. Conversely, when a second button 144 is pressed, the input transmitted to the implement controller(s) 126 is indicative of the hopper filling mode. Furthermore, the user interface 102 may include a second input device 146 configured to receive inputs associated with the selected position(s) of the ground engaging tool(s) 24. For example, in the illustrated embodiment, the second input device 146 includes first and second buttons 148, 150. When a first button 148 is pressed, the input transmitted to the implement controller(s) 126 is indicative of the operational position of the ground engaging tool(s) 24. Conversely, when a second button 150 is pressed, the input transmitted to the implement controller(s) 126 is indicative of the non-operational position of the ground engaging tool(s) 24. Additionally, the user interface 102 may include a third input device 152 configured to receive inputs associated with the selected operating state of the lighting device(s) 124. For example, in the illustrated embodiment, the third input device 152 includes first and second buttons 154, 156. When a first button 154 is pressed, the input transmitted to the implement controller(s) 126 is indicative of the illuminated state. Conversely, when a second button 156 is pressed, the input transmitted to the implement controller(s) 126 is indicative of the non-illuminated state. However, it should be appreciated that, in alternative embodiments, the user interface 102 may have any other suitable configuration. Furthermore, it should be appreciated that the user interface 102 may be configured as a graphical user interface (e.g., a suitable touchscreen) or a mechanical user interface.

Referring back to FIG. 3, in several embodiments, the implement controller(s) 126 may be configured to request the vehicle controller(s) 132 to control the operation of the valve(s) 118 and/or the switch(es) 120 on the work vehicle 12. Specifically, as shown in FIG. 3, the implement controller(s) 126 may be communicatively coupled to the vehicle controller(s) 132 via a wired or wireless connection to allow request signals (e.g., indicated by dashed lines 158 in FIG. 3) to be transmitted from the implement controller(s) 126 to the vehicle controller(s) 132. For example, in one embodiment, the request signals 158 may be transmitted from the implement controller(s) 126 to the vehicle controller(s) 136 via ISOBUS Class 3 (ISO 11783-9) communications protocols. However, in alternative embodiments, the request signals 158 may be transmitted via suitable CAN bus communications protocols or any other suitable communications protocols.

Upon receipt of the request signals 158, the vehicle controller(s) 132 may be configured to control the operation of the valve(s) 118 and/or the switch(es) 120 in the manner requested by the implement controller(s) 126. Specifically, the vehicle controller(s) 132 may be communicatively coupled to the valves(s) 118 and/or the switch(es) 120 to allow control signals (e.g., indicated by dashed lines 160 in FIG. 3) to be transmitted from the vehicle controller(s) 132 to the valves(s) 118. In this regard, the vehicle controller(s) 132 may be configured to control the operation of the valve(s) 118 in a manner that provides the fluid flow from the reservoir 104 to the selected fluid conduit 106, 108, 114. Furthermore, the vehicle controller(s) 132 may be configured to control the operation of the switch(es) 120 in a manner that adjusts the associated lighting device(s) 124 to the selected state.

Figure 5:
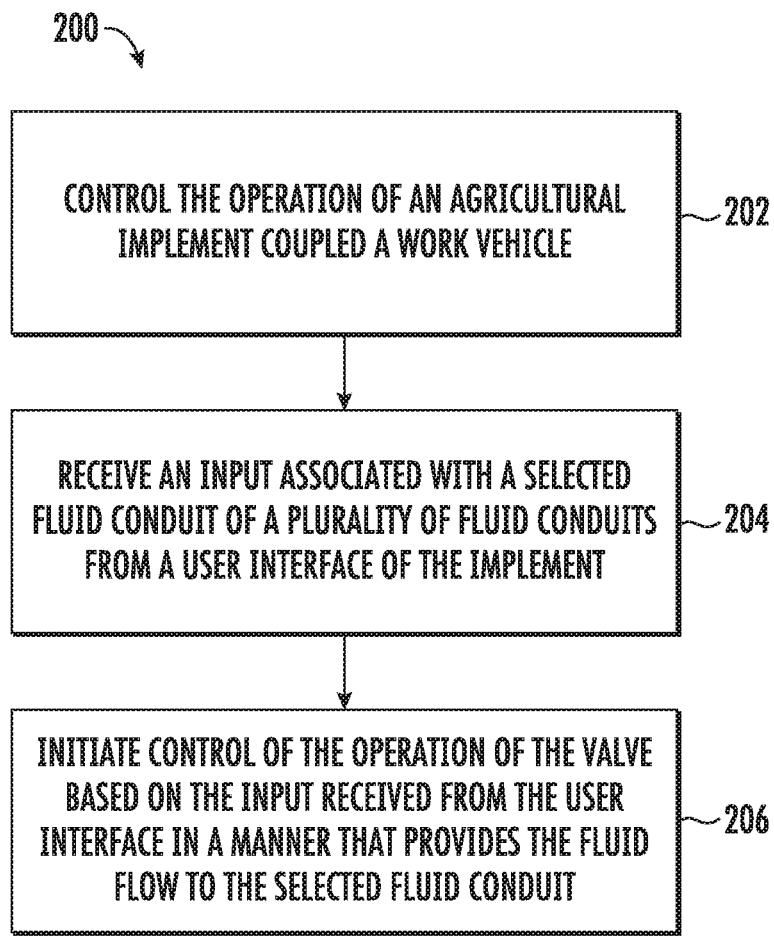
FIG. 5 illustrates a flow diagram of one embodiment of a method for controlling the operation of an agricultural implement in accordance with aspects of the present subject matter.

Referring now to FIG. 5, a flow diagram of one embodiment of a method 200 for controlling the operation of an agricultural implement is illustrated in accordance with aspects of the present subject matter. In general, the method 200 will be described herein with reference to the implement 10, the work vehicle 12, and the system 100 described above with reference to FIGS. 1-4. However, it should be appreciated by those of ordinary skill in the art that the disclosed method 200 may generally be utilized to control the operation of any agricultural implement having any suitable implement configuration and/or any work vehicle having any suitable vehicle configuration and/or in connection with any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling, with an implement-based computing device installed on an implement, the operation of an agricultural implement coupled a work vehicle. For instance, as described above, one or more implement controllers 126 may be communicatively coupled to one or more components, such as valve(s) 118, configured to control the operation of an agricultural implement 10. As such, the implement controller(s) 126 may be configured to transmit control signals 160 to the valve(s) 118 instructing the valve(s) 118 to adjust its operation, thereby adjusting the operation of one or more components of the implement 10.

Additionally, at (204), the method 200 may include receiving, with the implement-based computing device, an input associated with a selected fluid conduit of a plurality of fluid conduits from a user interface of the implement. For instance, as described above, the implement controller(s) 126 may be communicatively coupled to a user interface 102 configured to receive input from an operator of the implement 10 associated with a selected fluid conduit of the first, second, and third fluid conduits 106, 108, 114. As such, input signals 138 transmitted from the user interface 102 may be received by the implement controller(s) 126.

Moreover, as shown in FIG. 5, at (206), the method 200 may include initiating, with the implement-based computing device, control of the operation of the valve based on the input received from the user interface in a manner that provides the fluid flow to the selected fluid conduit. For instance, as described above, the implement controller(s) 126 may be configured to transmit request signals 158 to the vehicle controller(s) 132 requesting the vehicle controller(s) 132 to control the operation of the valve(s) 118 in a manner that provides the fluid flow to the selected fluid conduit 106, 108, 114.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling the operation of an agricultural implement, the system comprising:
   a work vehicle including a vehicle-based controller, the vehicle-based controller configured to control an operation of a valve provided in operative association with the work vehicle, the valve configured to control a fluid flow to a plurality of fluid conduits; and
   an agricultural implement configured to be towed by the work vehicle, the implement including:
      a user interface supported on the agricultural implement, the user interface including a first input device configured to receive an input associated with a selected fluid conduit of the plurality of fluid conduits; and
      an implement-based controller supported on the implement and communicatively coupled to the user interface, the implement-based controller configured to initiate control of the operation of the valve based on the input received from the user interface in a manner that provides the fluid flow to the selected fluid conduit;
      wherein the implement comprises at least one of an air cart or a seed planting implement;
      wherein a first fluid conduit of the plurality of fluid conduits is configured to provide the fluid flow to a tank filling mechanism of the implement in a manner that drives the tank filling mechanism and a second fluid conduit is configured to provide the fluid flow to a fan of the implement in a manner that drives the fan, the implement having a first operational mode in which the tank filling mechanism is driven and a second operational mode in which the fan is driven.

2. The system of claim 1, wherein the implement-based controller is configured to receive the input signals from the user interface and transmit signals to the vehicle-based controller requesting that the vehicle-based controller adjust the operation of the valve.

3. The system of claim 2, wherein the vehicle-based controller is configured to adjust the operation of the valve based on the signals received from the implement-based controller.

4. The system of claim 1, wherein the first input device is configured to receive an input associated with a selected operational mode of the first and second operational modes of the implement, the implement-based controller configured to initiate control of the operation of the valve based on the selected operational mode in a manner that provides the fluid flow to the corresponding fluid conduit of the first and second fluid conduits.

5. The system of claim 1, wherein the first input device is configured to receive an input associated with a selected speed of the fan or the tank filling mechanism, the implement-based controller configured to initiate control of the operation of the valve based on the selected speed in a manner that adjusts a volume of the fluid flow to the corresponding fluid conduit of the first and second fluid conduits.

6. The system of claim 1, wherein the vehicle-based controller is further configured to control an operation of a switch provided in operative association with the work vehicle, the switch configured to adjust a lighting device between an operational state and a non-operational state, the user interface further including a second input device configured to receive an input associated with a selected state of the operational and non-operational states of the lighting device, the implement-based controller being to initiate control of the operation of the switch based on the received input in a manner that adjusts the lighting device to the selected state.

7. A system for controlling the operation of an agricultural implement, the system comprising:
   a work vehicle including a vehicle-based controller, the vehicle-based controller configured to control an operation of a valve provided in operative association with the work vehicle, the valve configured to control a fluid flow to a plurality of fluid conduits; and
   an agricultural implement configured to be towed by the work vehicle, the implement including:
      a user interface supported on the agricultural implement, the user interface including a first input device configured to receive an input associated with a selected fluid conduit of the plurality of fluid conduits; and
   an implement-based controller supported on the implement and communicatively coupled to the user interface, the implement-based controller configured to initiate control of the operation of the valve based on the input received from the user interface in a manner that provides the fluid flow to the selected fluid conduit, wherein a first fluid conduit of the plurality of fluid conduits is configured to provide the fluid flow to an actuator of the implement in a manner that adjusts the position of a ground engaging tool of the implement relative to the ground between an operational position and a non-operational position;
   wherein the user interface further includes a second input device configured to receive an input associated with a selected position of the operational and non-operational positions of the ground engaging tool, the implement-based controller configured to initiate control of the operation of the valve based on the received input such that the actuator adjusts a position of the ground engaging tool to the selected position.

8. A method for controlling the operation of an agricultural implement, the method comprising:
   controlling, with an implement-based computing device installed on the implement, an operation of an agricultural implement coupled to a work vehicle, the work vehicle including a vehicle-based computing device configured to control an operation of a valve provided in operative association with the work vehicle, the valve configured to control a fluid flow to a plurality of fluid conduits;
   receiving, with the implement-based computing device, an input associated with a selected fluid conduit of the plurality of fluid conduits from a user interface supported on the agricultural implement; and
   initiating, with the implement-based computing device, control of the operation of the valve based on the input received from the user interface in a manner that provides the fluid flow to the selected fluid conduit;
   wherein the implement comprises at least one of an air cart or a seed planting implement;

wherein a first fluid conduit of the plurality of fluid conduits is configured to provide the fluid flow to a tank filling mechanism of the implement in a manner that drives the tank filling mechanism and a second fluid conduit is configured to provide the fluid flow to a fan of the implement in a manner that drives the fan, the implement having a first operational mode in which the tank filling mechanism is driven and a second operational mode in which the fan is driven.

9. The method of claim 8, further comprising:

transmitting, with the implement-based computing device, signals to the vehicle-based controller requesting that the vehicle-based controller adjust the operation of the valve.

10. The method of claim 8, further comprising:

receiving, with the implement-based computing device, an input associated with a selected operational mode of the first and second operational modes of the implement; and initiating, with the implement-based computing device, control of the operation of the valve based on the selected operational mode in a manner that provides the fluid flow to the corresponding fluid conduit of the first and second fluid conduits.

11. The method of claim 8, wherein a first fluid conduit of the plurality of fluid conduits is configured to provide the fluid flow to an actuator of the implement in a manner that adjusts the position of a ground engaging tool of the implement relative to the ground between an operational position and a non-operational position.

12. The method of claim 11, further comprising:

receiving, with the implement-based computing device, an input associated with a selected position of the operational and non-operational positions of the ground engaging tool; and initiating, with the implement-based computing device, control of the operation of the valve based on the received input such that the actuator adjusts a position of the ground engaging tool to the selected position.

\* \* \* \* \*